United States Patent [19]

Matsuno et al.

[11] Patent Number: 5,264,688
[45] Date of Patent: Nov. 23, 1993

[54] CARD CONVEYANCE MECHANISM HAVING CARD DISCHARGE MEANS FOR REMOVING A CARD FROM THE TRAVEL PATH WHEN ABNORMAL TRAVEL OCCURS

[75] Inventors: Ryuji Matsuno; Fukashi Yanagisawa, both of Nagano, Japan

[73] Assignee: Kabushiki Kaisha Sankyo Seiki Seisakusho, Nagano, Japan

[21] Appl. No.: 710,892

[22] Filed: Jun. 3, 1991

[30] Foreign Application Priority Data

Jun. 21, 1990 [JP] Japan ................ 2-65957[U]

[51] Int. Cl.⁵ .................................. G06K 13/08
[52] U.S. Cl. .................. 235/480; 235/475; 235/476
[58] Field of Search ............ 235/438, 375, 380, 475, 235/480, 481, 476, 436

[56] References Cited

U.S. PATENT DOCUMENTS

| | | | |
|---|---|---|---|
| 3,703,626 | 11/1972 | Shanrock | 235/480 |
| 3,760,391 | 9/1973 | Wolf et al. | 235/475 X |
| 3,939,327 | 2/1976 | Humphrey | 235/485 X |
| 3,949,191 | 4/1976 | Crowther et al. | 235/61.7 |
| 4,071,741 | 1/1978 | Frattarola et al. | 235/436 |
| 4,429,217 | 1/1984 | Hill et al. | 235/380 |
| 4,527,052 | 7/1985 | Kilborn | 235/475 X |
| 4,803,349 | 2/1989 | Sugimoto et al. | 235/475 |
| 5,012,073 | 4/1991 | Hewitt et al. | 235/375 |
| 5,119,356 | 6/1992 | Matsuoka et al. | 235/454 X |
| 5,150,352 | 9/1992 | Kurihara | 235/475 X |

FOREIGN PATENT DOCUMENTS

| | | | |
|---|---|---|---|
| 0159530 | 10/1985 | European Pat. Off. | 235/379 |
| 58-103081 | 6/1983 | Japan | 235/476 |
| 61-110279 | 5/1986 | Japan | 235/480 |
| 2-253388 | 10/1990 | Japan | 235/475 |

OTHER PUBLICATIONS

F. Hilpert, "Card Feed Chain", IBM Technical Disclosure Bulletin, vol. 4, No. 12, p. 1 (May 1962).
J. M. Creedon et al., "Card Feed System", IBM Technical Disclosure Bulletin, vol. 14, No. 1, p. 136 (Jun. 1971).

*Primary Examiner*—Davis L. Willis
*Assistant Examiner*—Edward H. Sikorski
*Attorney, Agent, or Firm*—Sughrue, Mion, Zinn, Macpeak & Seas

[57] ABSTRACT

A card conveyance mechanism used in a card reader so as to convey a card in a card travel path. The mechanism includes an abnormal card travel detecting device for detecting whether the card has jammed, and a card discharge device for discharging the card from the travel path in response to an output from the abnormal card travel detecting device. The discharge device includes an endless belt or chain (7) having a projecting pawl (8) which may normally be kept outside the card travel path by position detection sensor (9). The card may be discharged either to the card insertion port (4) or to a recovering box (5).

18 Claims, 3 Drawing Sheets

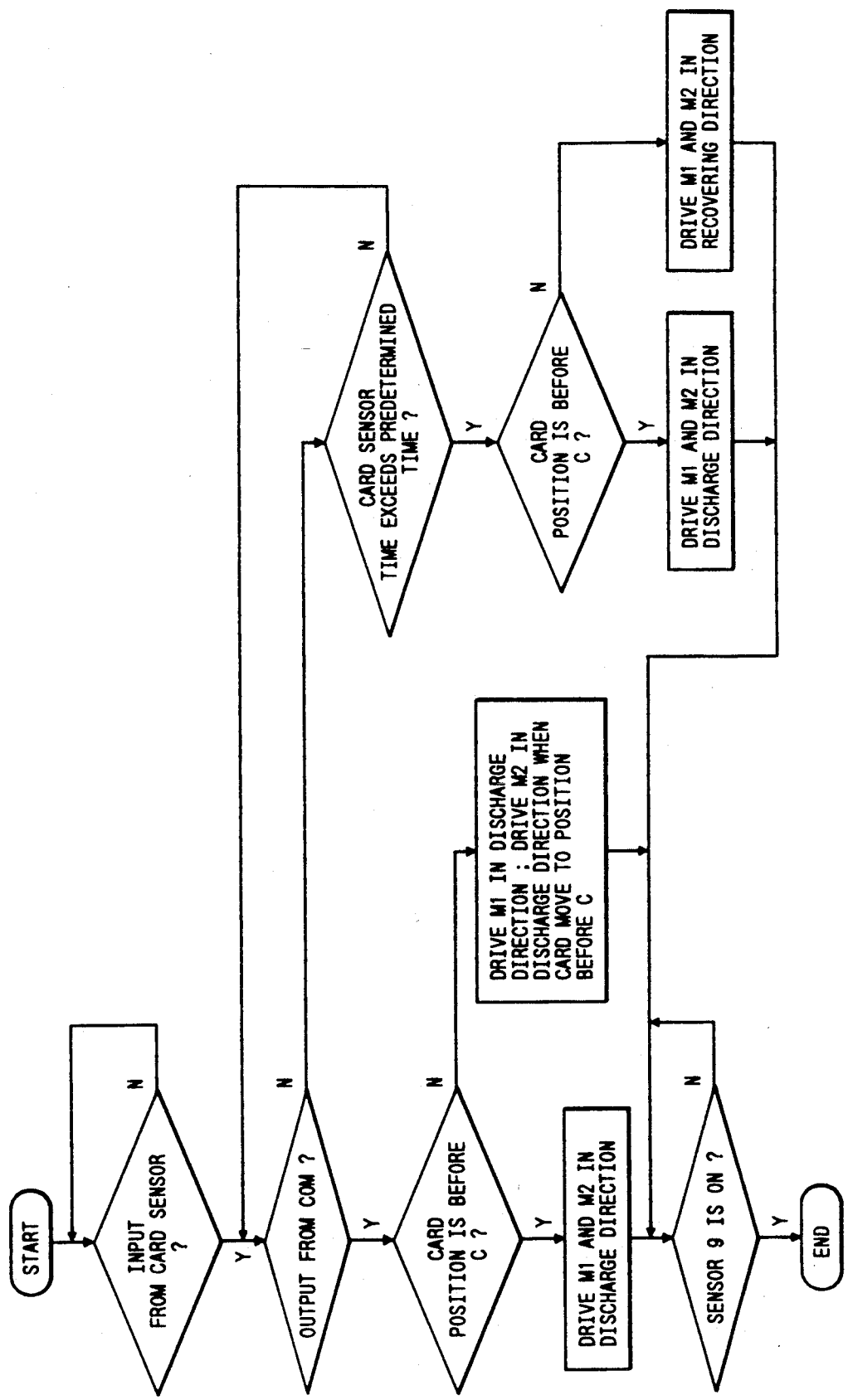

CARD CONVEYANCE MECHANISM HAVING CARD DISCHARGE MEANS FOR REMOVING A CARD FROM THE TRAVEL PATH WHEN ABNORMAL TRAVEL OCCURS

BACKGROUND OF THE INVENTION

This invention relates to a card conveyance mechanism used in a card reader so as to deliver a card in a card travel path to a predetermined position to discharge the card.

Recently, various cards have been used in many fields. When a card is inserted into a card reader, necessary information is written to an information recording portion of the card by a recording and reproducing means, such as a magnetic head, provided in the card reader, or information written to the information recording portion is reproduced by the recording and reproducing means.

In a card conveyance mechanism provided in such a card reader, feed mechanisms such as rubber rollers are provided in a card travel path, and these feed mechanisms are operated by a predetermined drive source through belts or the like.

However, in the card reader provided with such a card conveyance mechanism, slip may occur in the rubber rollers or the belts which transmit a conveyance force to the card. When slip occur in the rubber roller or the belt, the card in the card reader is brought into a jammed condition, so that the travel of the card becomes abnormal. Such card travel condition is always detected by predetermined position sensors, and the stop condition of the card is detected by the plurality of position sensors arranged at intervals slightly shorter than the length of the card. When the abnormal travel (i.e., the stop) of the card is detected, an alarm is generated since a system, such as an auto tellers machine (ATM) and a cash dispenser (CD), can not properly perform the processing, and the whole system is stopped. Conventionally, such a jammed condition of the card has been dealt with by a manual discharge of the card, as disclosed in Japanese Laid-Open (Kokai) Patent Application No. 72398/76, Japanese Utility Model Publication No. 17712/78 and Japanese Laid-Open Utility Model Application No. 9153/81. Therefore, in order to restore the system, assistance of an operator is needed.

SUMMARY OF THE INVENTION

It is therefore an object of this invention to provide a card reader in which a card, put into trouble in a card travel path, is automatically removed from the card travel path so that the next processing can be continuously carried out satisfactorily without stopping a system.

The above object has been achieved by a card conveyance mechanism used in a card reader so as to convey a card in a card travel path said mechanism comprising:

abnormal card travel-detecting means for detecting the condition of travel of the card and for producing an output at the time of an abnormal travel; and card discharge means operable in response to the output of said abnormal card travel-detecting means so as to remove the card, disposed in said card travel path, from said card travel path.

The card e means can comprise an endless belt provided along the card travel path, a projection fixedly mounted on the endless belt so as to engage an edge of the card, and drive means for driving the endless belt. The endless belt may be a chain.

In the above construction, when an abnormal travel of the card is detected by the abnormal card travel-detecting means, a predetermined operation instruction signal is outputted from this abnormal card travel-detecting means to the card discharge means, and the card, put into trouble in the card travel path, is removed from the card travel path by the operation of the card discharge means.

BRIEF DESCRIPTION OF THE DRAWINGS

FIG. 4 is a flow chart of the operation to be carried out by the construction of FIG. 3;

DETAILED DESCRIPTION OF THE PREFERRED EMBODIMENTS

Preferred embodiments of the invention will now be described in detail with reference to the drawings.

Figure 1:
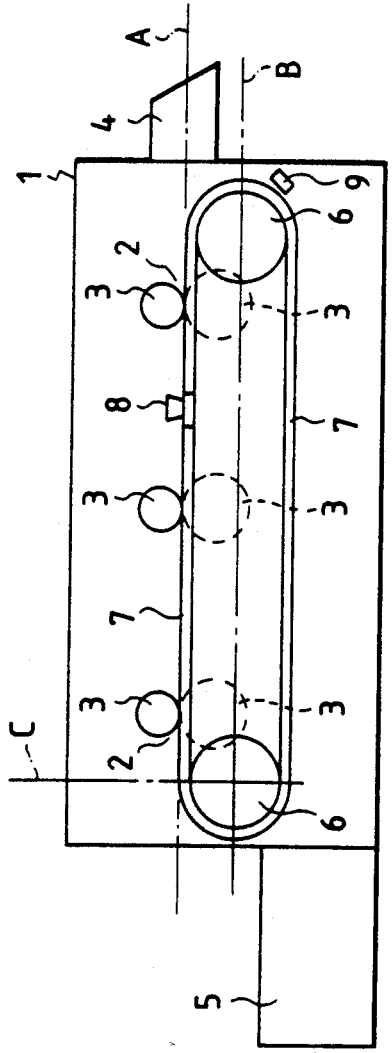
FIG. 1 is a side-elevational view of a conveyance system of one preferred embodiment of a card reader of the present invention.

In the embodiment shown in FIG. 1, a card travel path 2 for delivering a card D is generally horizontally provided in an apparatus body 1. A plurality of feed rollers 3 are provided in the card travel path 2, and are spaced from one another along the card travel path 2. A card insertion portion (opening) 4 is mounted on the apparatus body 1 at the card insertion side (the right end in FIG. 1) of the card travel path 2. A card recovering box 5 is mounted on the apparatus body 1 at the opposite end (the left end in FIG. 1) of the card travel path remote from the card insertion portion 4.

Figure 2:
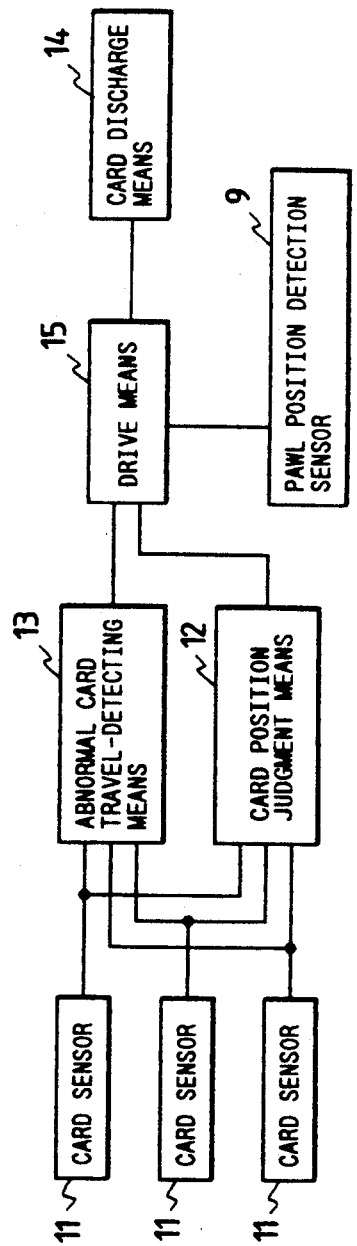
FIG. 2 is a block diagram of conveyance control means used in the card reader of FIG. 1.

A plurality of card position sensors 11 (not shown in FIG. 1), serving as abnormal card travel-detecting means, are provided in the card travel path 2. These card position sensors 11 are provided adjacent respectively to the feed rollers 3 and are spaced at intervals slightly shorter than the length of the card. As shown in FIG. 2, signals from the card position sensors 11 are inputted into a card position judgment means 12 and an abnormal card travel-detecting means 13. In the abnormal card travel-detecting means 13, it is determined whether the travel of the card is normal or abnormal, and when the condition of travel of the card is detected sequentially by the card position sensors 11, it is determined that the card travels normally. When the detection is not made upon lapse of a predetermined time period, as when the card is stopped, it is determined that abnormal card travel is involved.

Referring again to FIG. 1, a card discharge means 14 (FIG. 2) for discharging the card to the exterior of the card travel path 2 in the event of an abnormal card travel is provided in the card travel path 2. This card discharge means 14 includes an endless chain (endless belt) 7 extended around a pair of sprockets 6 and 6. A drive means 15 for the chain 7 is connected to one of the pair of sprockets 6, and can be switched between a normal rotation and a reverse rotation.

As shown in FIG. 2, instruction signals from the card position judgment means 12 and the abnormal card traveldetecting means 13 are input into the drive means 15 for the card discharge means 14 which includes the chain 7. In accordance with the abnormal travel-detecting signal from the abnormal card travel-detecting means 13 and the card position detection signal from the card position judgment means 12, the drive means 15 for the chain 7 is driven in its normal or reverse direction. Whether the chain 7 rotates in its normal or reverse direction is determined by the card position detection signal from the card position judgment means 12. This will be described later.

As shown in FIG. 1, the upper portion of the chain 7 is disposed along a card travel plane A in the card travel path 2, and a projecting pawl 8 fixedly secured to the chain 7 is adapted to be projected into the card travel path 2 while the pawl 8 is moved. One or two projecting pawls 8 are provided (In the case of two pawls, they are arranged in diagonally-opposite relation) and are engageable with one end edge of the card to hold the card. In accordance with a signal from a pawl position detection sensor (position control mechanism) 9, the projecting pawl 8 is caused to stand by in a predetermined position, as later described. Namely, in the normal condition in which the card is delivered normally, the projecting pawl 8 is held in a region where the pawl 8 will not be projected into the card travel path 2, that is, in a stand-by region of the chain 7 disposed below a centerline B passing through the axes of the sprockets 6.

The pawl position detection sensor 9 serves to detect the position of the projecting pawl 8, and is disposed in the stand-by position of the chain, and more specifically at a position opposed to that portion of the sprocket 6 around which the chain 7 is turned.

Figure 6:
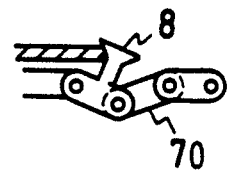

When the projecting pawl 8 engages one end edge of the card so as to discharge the card, the chain 7 may be bent downward (i.e., displaced), so that this engagement may be released, because the chain 7 is of the link-connecting type. Therefore, it is preferred to use a projecting pawl 8 of a generally T-shape having a vertical portion 81 and an inclined portion 82, in which case even when the chain is bent downward as shown in FIG. 6, the above engagement will not be released.

Figure 5:
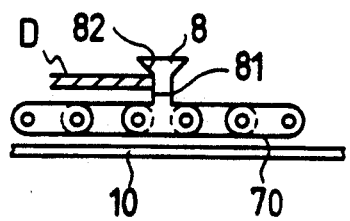
FIGS. 5 and 6 are views showing modified projecting pawls, respectively.
Figure 7:
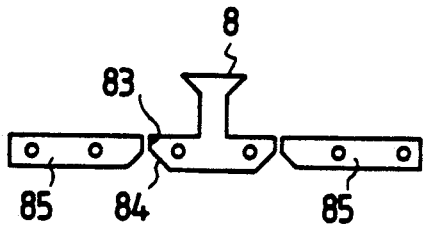
FIG. 7 is a view showing a modified form of the invention employing means for preventing a downward displacement of a chain.

Preferably, a downward displacement-limiting guide 10 is provided below the discharge-side portion 70 of the chain in closely opposed relation thereto as shown in FIG. 5. Alternatively, downward displacement-prevention pieces 85 are provided on the chain 7 as shown in FIG. 7, in which case the downward displacement is prevented by opposed vertical surfaces 83, and also the bending of the chain at the sprockets 6 is not affected because of the provision of inclined surfaces 84.

As shown in FIG. 2, the output signal of the pawl position detection sensor 9 is applied to the drive means 15 for the chain 7, thus constituting the position control mechanism. In accordance with the output signal of the pawl position detection sensor 9, the stand-by position of the projecting pawl 8 is controlled. Namely, in the normal condition in which the card is delivered normally, in accordance with the detection signal from the pawl position detection sensor 9, the projecting pawl 8 is stopped at the predetermined position outside of the card travel path 2, that is, at the position where the pawl 8 is opposed to the pawl position detection sensor 9. And, after the chain 7 is once driven, the projecting pawl 8 is returned again to the initial position and is stopped there.

In the apparatus of this embodiment, first, the card is inserted into the card travel path 2 through the card insertion portion 4. The thus inserted card is conveyed to the left (FIG. 1) by the feed rollers 3, and necessary information is written onto an information recording portion of the card by a recording and reproducing means, such as a magnetic head, or information written on the information recording portion is reproduced.

At this time, when the card is brought into a jammed condition due, for example, to slip occurring at the feed roller 3 and a belt which transmit the conveying force to the card, the predetermined operation instruction signal is output from the abnormal card travel-detecting means 13 to the drive means 15 for the card discharge means 14 in accordance with the output of the card position sensor 11.

As a result, the chain 7 is of the card discharge means 14 begins to be driven in a selected one of its normal and reverse directions, and the projecting pawl 8 mounted on the chain 7 is moved from the outside of the card travel path 2 into this travel path. Then, the projecting pawl 8 is brought into engagement with the card put in trouble in the card travel path 2, and by the driving of the chain 7, the card is discharged from the card insertion portion 4, or is recovered to the card recovering box 5.

In this embodiment, the position of stop of the card due to its abnormal travel is detected by the card position sensors, and when the card is stopped on the side of the card insertion portion 4 with respect to a vertical centerline C of the sprocket 6 disposed adjacent to the card recovering box 5 (i.e., the left side in FIG. 1), the card is discharged from the card insertion portion 4 to be returned to the customer. When the card is stopped on the side of the card recovering box 5 with respect to the vertical centerline C of the sprocket 6, the card is transferred or recovered to the card recovering box 5, and is stored therein.

After the card is thus discharged or recovered, the projecting pawl 8 is stopped at the initial position where the pawl 8 is opposed to the pawl position detection sensor 9, and is not projected into the card travel path 2. Then, the system is returned to the normal operating condition.

The endless chain 7 used as the card discharge means may be replaced by a toothed belt wire or the like. The drive means for the chain may be separate from the drive means for conveying the card, and may be a common drive means for both through the agency of a clutch or the like. The chain 7 may be extended longer beyond the end of the card travel path 2 remote from the card insertion portion 4, and the chain may be adapted to be moved only in the discharging direction, in which case all of the cards jammed in the card travel path 2 can be discharged.

In the case where two projecting pawls 8 are provided in diagonally-opposite relation, the time required for the projecting pawl to reach the card can be reduced to a half of the time achieved by one projecting pawl. This is efficient.

Figure 3:
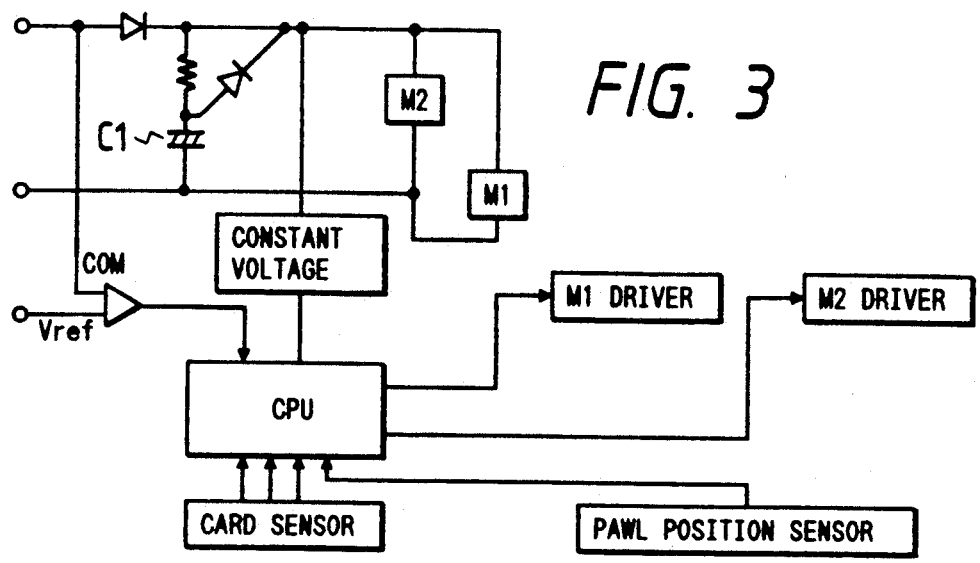
FIG. 3 is an illustration showing a specific example of the conveyance control means of FIG. 2.

Next, one example of card conveyance apparatus using a CPU will now be described with reference to FIG. 3. Reference character M1 denotes a drive motor for card feed rollers 3, and reference character M2 denotes a motor (drive means 15), and reference character COM denotes a comparator outputting a signal at the time of an electric power stoppage (power failure), and reference character C1 denotes a large-capacity capacitor connected in parallel with the motors and having such a capacity as to operate the CPU, sensors 11, the motors M1 and M2 at the time of a power stoppage so as to discharge the card.

The CPU is supplied with a constant voltage, and receives outputs from the sensors and the comparator, and outputs drive signals (including the instruction of rotation) to drivers for the motors M1 and M2. The CPU judges the abnormal travel in accordance with the time of inputting from the sensors, and judges the position of stop of the card in accordance with the inputting from the sensors, and determines the direction of rotation of the motors, and monitors a power stoppage. Moreover, the CPU controls the card reader operation in the condition that the travel of card is normal. (not shown in FIG.3.)

The operation is carried out as shown in a flow chart of FIG. 4.

When the card reader is driven, it is judged in Step 1 whether or not the card position sensor 11 is detecting the card. If the result is "YES", it is determined in Step 2 in accordance with the existence of the output from the comparator COM whether or not a power stoppage is occurring. If the result indicates the normal condition (that is, no power stoppage is occurring), it is determined in Step 3 whether or not the time period of detection of the card by the card position sensor 11 exceeds a predetermined time period. If the result is "YES", it is judged that an abnormal card travel is occurring. Incidentally, the predetermined time period is determined for each of the card position sensors 11, and if the detection time of any of the card position sensors 11 exceeds the predetermined time period, it is determined that an abnormal card travel is involved. In the case of the abnormal card travel, by detecting which card position sensor 11 is detecting the card, it is judged in Step 4 whether or not the card is stopped before the position C (FIG. 1). If the card is stopped before the position C, the motors M1 and M2 are driven in the discharge direction to forcibly discharge the card (Step 5). In contrast, if the card is stopped beyond the position C, the motors M1 and M2 are driven in the recovering direction to forcibly recover the card (Step 6). The discharge or the recovery of the card is finished when the pawl position detection sensor 9 detects the pawl in Step 7, and the card conveyance is finished when this detection is made.

On the other hand, if it is judged in Step 2 that a power stoppage is involved, it is necessary to forcibly discharge the card so as to return the card to the customer. Therefore, in Step 8 as in Step 4, it is determined whether or not the card is stopped before the position C (FIG. 1). If the card is stopped before the position C, the motors M1 and M2 are driven in the discharge direction to forcibly discharge the card (Step 9). In contrast, if the card is stopped beyond the position C, the motor M1 is driven to return the card, and when the card is moved to a position before the position C, this is detected by the position sensor 11, and in accordance with this detection, the motor M2 is also driven in the discharge direction to forcibly discharge the card Step 10. The discharge of the card is finished when the pawl position detection sensor 9 detects the pawl in Step 7, and the card conveyance is finished when this detection is made.

Although the forcible discharge or the forcible recovery can be done only by driving the endless belt, it is preferred to also rotate the rollers 3 since the rollers 3 produce a load on the card conveyance.

In the case where the projecting pawl 8 shown in FIG. 5 is used, the projecting pawl 8 may scratch the rear end portion of the card to damage it when the projecting pawl 8 is moved downward by the sprocket at a final stage of the discharge operation. Therefore, the discharge operation may be finished before the projecting pawl 8 moves downward, in which case subsequently, the belt is driven in the reverse direction.

Figures 8, 9:
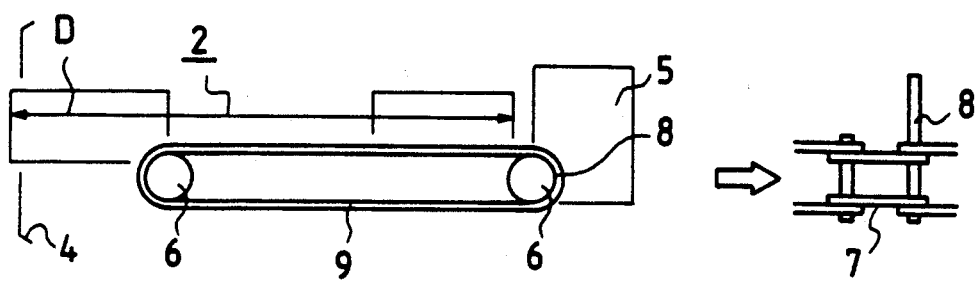
FIG. 8 is a modified form of the invention in which an endless belt is disposed in a horizontal plane.
FIG. 9 is a view showing a projecting pawl used in the endless belt of FIG. 8.

In the above embodiment, the endless belt is disposed in a vertical plane perpendicular to the card travel plane; however, the endless belt may be disposed in a horizontal plane parallel to the card travel plane as shown in FIG. 8, in which case the projecting pawl is not moved downward, so that the above-mentioned release of the engagement will not be encountered even by the use of the chain, and the problem of scratch will not be encountered.

As described above, in the present invention, an abnormal travel of the card is detected by the card abnormal travel-detecting means, and in response to the operation instruction signal from this abnormal card travel-detecting means, the card discharge means is driven to remove the card, put into trouble in the card travel path, from the card travel path. Therefore, the card, put into trouble in the card travel path, can be automatically removed from the card travel path, and the next processing operation can be carried out continuously without the aid of an operator and also without stopping the system.

What is claimed is:

1. A card conveyance mechanism used in a card reader so as to convey a card in a card travel path, said mechanism comprising:

card conveying means for conveying said card in said card travel path;

abnormal card travel detecting means for detecting a normal or abnormal condition of travel of said card and for producing an output signal when the abnormal condition of travel is detected; and card discharge means, which is separate and distinct from said card conveying means, for discharging said card disposed in said card travel path from said card travel path in response to the output signal of said abnormal card travel detecting means, said card discharge means including an endless belt provided along said card travel path, a projection fixedly mounted on said endless belt so as to engage an edge of said card, and drive means for driving said endless belt, wherein said card discharge means is operative independently from said card conveying means and only for discharging said card in response to the output signal, and further wherein said projection, which is mounted on said endless belt, is normally kept at a position outside said card travel path.

2. A card conveyance mechanism as claimed in claim 1, wherein said card discharge means includes position control means for detecting said projection of said card discharge means at a position outside said card travel path and for stopping said endless belt such that said projection is kept at a position outside said card travel path.

3. A card conveyance mechanism as claimed in claim 2, wherein said position control means includes a projection detection sensor.

4. A card conveyance mechanism as claimed in claim 1, wherein said endless belt is extended beyond an end of said card travel path remote from a card insertion portion of said card travel path.

5. A card conveyance mechanism as claimed in claim 1, wherein said endless belt is a chain.

6. A card conveyance mechanism as claimed in claim 5, further comprising:
displacement prevention means for preventing said chain from being displaced from a path of movement of said chain.

7. A card conveyance mechanism as claimed in claim 6, wherein said displacement prevention means includes pieces for preventing a downward displacement of said chain, said pieces are provided respectively on opposite ends of each of chain elements of said chain in opposed relation thereto.

8. A card conveyance mechanism as claimed in claim 6, wherein said displacement prevention means includes a downward displacement limiting guide provided in closely spaced, opposed relation to the lower side of a discharge portion of said chain.

9. A card conveyance mechanism as claimed in claim 1, wherein said card discharge means is disposed in a horizontal plane parallel to the plane of said card travel path, and said projection is disposed in a vertical plane which is vertical to the plane of said card travel path.

10. A card conveyance mechanism as claimed in claim 1, wherein said projection includes a vertical portion and an inclined portion.

11. A card conveyance mechanism as claimed in claim 1,
wherein said driving means has a direction of rotation, and
wherein said card discharge means decides the direction of rotation of said driving means in accordance with an output signal of said card position detecting means.

12. A card conveyance mechanism as claimed in claim 1, wherein said driving means includes a motor and a motor drive circuit, said motor drive circuit having a capacitor for discharging electric current at the time of an electric power stoppage to thereby drive said motor.

13. A card conveyance mechanism as claimed in claim 12, wherein said capacitor discharges electric current at the time of the electric power stoppage to thereby drive said endless belt of said card discharge means.

14. A card conveyance mechanism used in a card reader so as to convey a card in a card travel path, said mechanism comprising:
abnormal card travel detecting means for detecting a normal or abnormal condition of travel of said card and for producing an output signal when the abnormal condition of travel is detected;
a card conveying device for conveying said card in said card travel path; and
a card discharge device, which is separate and distinct from said card conveying device, for discharging said card disposed in said card travel path from said card travel path in response to the output signal of said abnormal card travel detecting means, said card discharge device being operative independently from said card conveying device and only for discharging said card in response to the output signal, wherein said card conveying device includes at least a plurality of rollers which directly contact said card in said card travel path, and
wherein said card discharge device includes at least an endless belt provided along said card travel path and a projection fixedly mounted on said endless belt so as to engage an edge of said card.

15. A card conveyance mechanism as claimed in claim 14, wherein said projection includes a vertical portion and an inclined portion.

16. A card conveyance mechanism as claimed in claim 14, wherein said card discharge device includes position control means for detecting said projection of said card discharge device at a position outside said card travel path and for stopping said endless belt such that said projection is excluded from said card travel path.

17. A card conveyance mechanism as claimed in claim 14, further comprising:
displacement prevention means for preventing said endless belt from being displaced from a path of movement of said endless belt.

18. A card conveyance mechanism as claimed in claim 14, wherein said projection is normally kept at a position outside said card travel path.

* * * * *